United States Patent
Higashiya

(10) Patent No.: US 7,719,783 B2
(45) Date of Patent: May 18, 2010

(54) HARD DISK DRIVE WITH MECHANISM FOR CONTROLLING PROTRUSION OF HEAD

(75) Inventor: Teruyoshi Higashiya, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 551 days.

(21) Appl. No.: 11/525,322

(22) Filed: Sep. 21, 2006

(65) Prior Publication Data
US 2007/0064332 A1 Mar. 22, 2007

(30) Foreign Application Priority Data
Sep. 22, 2005 (JP) ............................. 2005-276410

(51) Int. Cl.
G11B 21/02 (2006.01)
G11B 5/127 (2006.01)
(52) U.S. Cl. ................ 360/75; 360/125.31; 360/125.74
(58) Field of Classification Search ............ 360/75, 360/125.31, 125.74, 128, 294.1
See application file for complete search history.

(56) References Cited

U.S. PATENT DOCUMENTS

2002/0191326 A1* 12/2002 Xu et al. .................. 360/75
2003/0174430 A1   9/2003 Takahashi et al.
2005/0046985 A1*  3/2005 Morinaga et al. ............. 360/31
2005/0129090 A1*  6/2005 Sheperek et al. ............ 374/185
2005/0213250 A1*  9/2005 Kurita et al. ............. 360/234.4

FOREIGN PATENT DOCUMENTS

JP        10-269527       10/1998

* cited by examiner

Primary Examiner—William J Klimowicz
Assistant Examiner—Gustavo Polo
(74) Attorney, Agent, or Firm—Townsend and Townsend and Crew LLP; John Henkhaus

(57) ABSTRACT

Embodiments of the invention suppress collision between a head element section and a magnetic disk. In manufacturing a hard disk drive (HDD) according to an embodiment of the present invention, recession R is preliminarily measured for each head slider. Recession R means the amount of recession of the head element section relative to the slider. Write current and heater current values respectively for the write device and the TFC heater are registered based on the measured recession. Since these values are set according to the recession of the head element section, it is possible to prevent each head element section from colliding with the magnetic disk while reducing the clearance between each head element section and the magnetic disk.

8 Claims, 8 Drawing Sheets

| Head vs. Recession Level Table | |
|---|---|
| Head No. | Recession Level (RL) |
| 0 | 3 |
| 1 | 1 |
| 2 | 0 |
| 3 | 2 |

| Write Current Table | | | |
|---|---|---|---|
| | Low Temperature (LT) | Nominal Temperature (NT) | High Temperature (HT) |
| RL0 | Write_Current_L0 | Write_Current_N0 | Write_Current_H0 |
| RL1 | Write_Current_L1 | Write_Current_N1 | Write_Current_H1 |
| RL2 | Write_Current_L2 | Write_Current_N2 | Write_Current_H2 |
| RL3 | Write_Current_L3 | Write_Current_N3 | Write_Current_H3 |

| Heater Power Table | | | |
|---|---|---|---|
| | Low Temperature (LT) | Nominal Temperature (NT) | High Temperature (HT) |
| RL0 | Heater_Power_L0 | Heater_Power_N0 | Heater_Power_H0 |
| RL1 | Heater_Power_L1 | Heater_Power_N1 | Heater_Power_H1 |
| RL2 | Heater_Power_L2 | Heater_Power_N2 | Heater_Power_H2 |
| RL3 | Heater_Power_L3 | Heater_Power_N3 | Heater_Power_H3 |

HARD DISK DRIVE WITH MECHANISM FOR CONTROLLING PROTRUSION OF HEAD

CROSS-REFERENCES TO RELATED APPLICATIONS

This application claims priority from Japanese Patent Application No. JP2005-276410, filed Sep. 22, 2005, the entire disclosure of which is incorporated herein by reference.

BACKGROUND OF THE INVENTION

The present invention relates to a data storage apparatus and a manufacturing method thereof. In particular, the invention relates to a mechanism which controls the protrusion of a head element section in a data storage apparatus and a manufacturing technique which facilitates the control.

As known, there are a variety of data storage devices which use different types of media such as optical disks and magnetic tapes. Among them, the hard disk drive (HDD) has become so popular as to be one of the indispensable storage devices for today's computer systems. Further, not limited to computers, the hard disk drive is widening its range of application more and more due to the superior characteristics, covering moving picture recording/reproducing apparatus, car navigation systems, cellular phones, removable memories for digital cameras and so on.

Each magnetic disk used in hard disk drives has a plurality of data tracks formed concentrically. In each data track, a plurality of data sectors are recorded which contain a plurality of servo data, including address information, and user data. A plurality of data sectors are recorded between servo data. Data can be written to and read from a desired data section by a head element section of a head slider held on an actuator which is swung to access the data section according to the address information of the servo data.

During operation, the head slider forms a spacing in the order of several or several ten nanometers between it and the magnetic disk by using the air flow which is caused by the rotating magnetic disk. To allow the head slider to stably hover or glide, the magnetic disk should have a flat and smooth surface. In order to realize high recording density, however, tiny bumps are formed on the magnetic disk surface. It is difficult to form these tiny bumps uniformly in height. That is, it is difficult to completely remove abnormally high bumps.

In the case of a head element section using a magnetoresistive effect transducer, if an abnormally high bump touches the head element section, this contact raises the temperature of the element section due to frictional heat, which temporally changes the resistance and therefore causes an abnormality in the read signal. This abnormality is called a Thermal Asperity (TA). Further, it is possible that the magnetic head itself may be damaged if the magnetic head makes harsh contact with a tiny bump.

As a solution to this problem, a magnetic disk drive is disclosed in Patent Document 1 (Japanese Patent Laid-open No. 10-269527). A head slider mounted in the magnetic disk drive is characterized in that a head element section formed by thin film process technology is recessed from the head slider surface so as to depart more from the magnetic disk. That is, this technique forms a recessed head element step on the slider in order to prevent the magnetic head from making contact with tiny bumps on the magnetic disk.

In terms of magnetic read/write, however, this technique causes more deterioration in performance if the recession of the device element section is enlarged since the clearance between the head device section and the magnetic disk becomes larger although thermal asperities can be suppressed. Enlarging the recession does not simply mean a better result.

As a solution in terms of both head failure and performance, a head slider is disclosed in Patent Document 2 (Japanese Patent Laid-open No. 2003-272335). In addition to a write device and a read device, the head element section of this head slider has a thermal expansion element and a contact detector near the read and write devices. Further, the head element section is recessed in advance from the slider surface which faces the magnetic disk. In the magnetic disk drive, as necessary for write or read, electricity is supplied to the thermal expansion element to expand the element. This makes the head element section closer to the magnetic disk. If the expansion is excessive, the head element section may protrude beyond the slider surface faced toward the magnetic disk. In this case, it is possible that the head device section may make contact with tiny bumps on the magnetic disk. So as to avoid contact with tiny bumps due to excessive protrusion, the amount of electricity supplied to the thermal expansion element is adjusted according to the spacing detector.

This technique makes it possible to prevent the head element section from making contact with tiny bumps on the magnetic disk while controlling the spacing between the head element section and the magnetic disk. However, head sliders which are actually mounted in data storage apparatus have different flying characteristics. Furthermore, the recession of the head element section differs among the head sliders.

In addition, in a comparison between a head slider having a small recessed head element step on a slider and a large flying height and a head slider having a larger recessed head element step on a slider and a small flying height, it is more difficult for the former than the latter to judge whether the head element section is protruded beyond the slider surface faced toward the magnetic disk when the thermal expansion element is energized and expanded for write or read.

Therefore, this technique is not effective for new bumps grown from defects on the magnetic disk and dust particles inhaled between the head slider and the magnetic disk during the operation of the magnetic disk drive. The risk of the head element section being damaged by contact with such bumps and particles is not yet eliminated.

BRIEF SUMMARY OF THE INVENTION

The present invention has been made to allow effective suppression of collisions between the magnetic disk and the head element section of the head slider regardless of the recession of the head element section subject to variation due to process fluctuations.

According to a first aspect of the present invention, there is provided a data storage apparatus which comprises: a head slider comprising a slider and a head element section wherein the head element section is recessed from the slider when viewed from a magnetic disk; a controller which refers to preliminarily registered data and determines the magnitude of current to be supplied to a heating element capable of changing the protrusion of the head element section wherein the registered data represents a magnitude of current appropriate for the recession level of the head element section; and a current supply circuit which supplies a current to the heating element according to the determination of the controller. Since the magnitude of current to be supplied to the heating element capable of changing the protrusion of the head element section is determined by referring to the registered data representing an appropriate magnitude of current for the recession level of the head element section, it is possible to effectively suppress collision between the head element section and the magnetic disk even if the recession level differs among head sliders due to process fluctuations.

According to a second aspect of the present invention, there is provided a data storage apparatus according to the above-mentioned first aspect, wherein the heating element is a heater to adjust the protrusion of the head element section and the current to the heating element is a heater current which flows along the heater. By the heater, it is possible not only to raise the performance by protruding the head element section but also to effectively suppress collision between the head element section and the magnetic disk even if the recession level differs among head sliders due to process fluctuations.

According to a third aspect of the present invention, there is provided a data storage apparatus according to the above-mentioned first aspect, wherein the heating element is a write device; and the current to the heating element is a write current to write data to the magnetic disk. This makes it possible to effectively suppress collision between the head element section by adjusting the protrusion of the head element section by the write current.

According to a fourth aspect of the present invention, there is provided a data storage apparatus according to the above-mentioned first aspect, wherein: the data storage apparatus includes a plurality of head sliders; the controller refers to preliminarily registered data and determines the magnitude of current to be supplied to each of the plural head sliders wherein the registered data represents a magnitude of current appropriate for the recession level of the head element section of each head slider; and the registered data is such that the magnitude of current set to a head slider is larger than that set to a head slider having a smaller recession level. Since a current magnitude is set and registered for each head slider according to the recession level, it is possible to effectively suppress collision between the head element section and the magnetic disk even if the recession level differs among head sliders due to process fluctuations.

According to a fifth aspect of the present invention, there is provided a data storage apparatus according to the above-mentioned first aspect, wherein the registered data is such that the magnitude of current increases as the preliminarily measured recession level of the head slider increases. Since the current magnitude is registered in this manner, it is possible to suppress collision between the magnetic disk and the head element section while reducing the clearance between the head element section and the magnetic disk.

According to a sixth aspect of the present invention, there is provided a data storage apparatus according to the above-mentioned first aspect, wherein the registered data includes a plurality of temperature level-dependent values as current magnitudes. Since the current magnitudes are registered in this manner, it is possible to suppress collision between the magnetic disk and the head element section while reducing the clearance between the head element section and the magnetic disk even if the protrusion of the head element section changes depending on the ambient temperature.

According to a seventh aspect of the present invention, there is provided a data storage apparatus manufacturing method which comprises the steps of: manufacturing a head slider having a slider and a head element section; measuring the manufactured head slider to determine the recession level of the head element section from the slider; constructing an assembly having the measured head slider and an actuator and installing the assembly in a chassis; setting and registering data which represents a current magnitude appropriate for the determined recession level of the head element section; and installing a controller which refers to the registered data and determines the magnitude of current to be supplied to a heating element section capable of changing the protrusion of the head element section, and a current supply circuit which supplies a current to the heating element according to the determination of the controller. Since the registered current magnitude is determined according to the recession level of the head slider measured preliminarily in the process of manufacturing the data storage apparatus, it is possible to suppress collision between the magnetic disk and the head element section while reducing the clearance between the head element section and the magnetic disk.

According to an eighth aspect of the present invention, there is provided a data storage apparatus manufacturing method according to the above-mentioned seventh aspect, wherein the head slider has a heater as the heating element to adjust the protrusion of the head element section and the magnitude of current is the magnitude of heater current which flows along the heater. According to a ninth aspect of the present invention, there is provided a data storage apparatus manufacturing method according to the above-mentioned seventh aspect, wherein the heating element is a write device and the magnitude of current is the magnitude of write current to write data to the magnetic disk.

According to a tenth aspect of the present invention, there is provided a data storage apparatus which comprises: a plurality of head sliders each of which has a slider and a head element section, the head element section being recessed from the slider when viewed from a magnetic disk; a controller which determines the magnitude of current to be supplied to the heating element of each of the plural head sliders to increase the protrusion of the head element section in such a manner that the magnitude of current is increased as the recession level of the head element section increases; and a current supply circuit which supplies a current to the heating element according to the determination of the controller. Since a current magnitude is set and registered for each head slider according to the recession level, it is possible to effectively suppress collision between the head element section and the magnetic disk even if the recession level differs among head sliders due to process fluctuations.

According to an eleventh aspect of the present invention, there is provided a data storage apparatus according to the above-mentioned tenth aspect, wherein the heating element is a heater to adjust the protrusion of the head element section and the current to the heating element is a heater current which flows along the heater. According to a twelfth aspect of the present invention, there is provided a data storage apparatus according to the above-mentioned tenth aspect, wherein the heating element is a write device; and the current to the heating element is a write current to write data to the magnetic disk. According to a thirteenth aspect of the present invention, there is provided a data storage apparatus according to the above-mentioned tenth aspect, wherein the magnitude of current represented by the data is determined based on the preliminarily measured recession level of the head element section.

According to the present invention, a heater is used to adjust the clearance between the head and the medium by protruding the head. This technique makes it possible to reliably access data in a data area while reducing the possibility of collision between the medium and the head.

BRIEF DESCRIPTION OF THE DRAWINGS

FIG. 9 shows a head vs. recession level table which associates each head slider with a recession level in the present embodiment.

FIG. 10 shows a write current table which associates each recession level with a write current value in the present embodiment.

FIG. 11 shows a heat power table which associates each recession level with a heater power value.

DETAILED DESCRIPTION OF THE INVENTION

Figure 1:
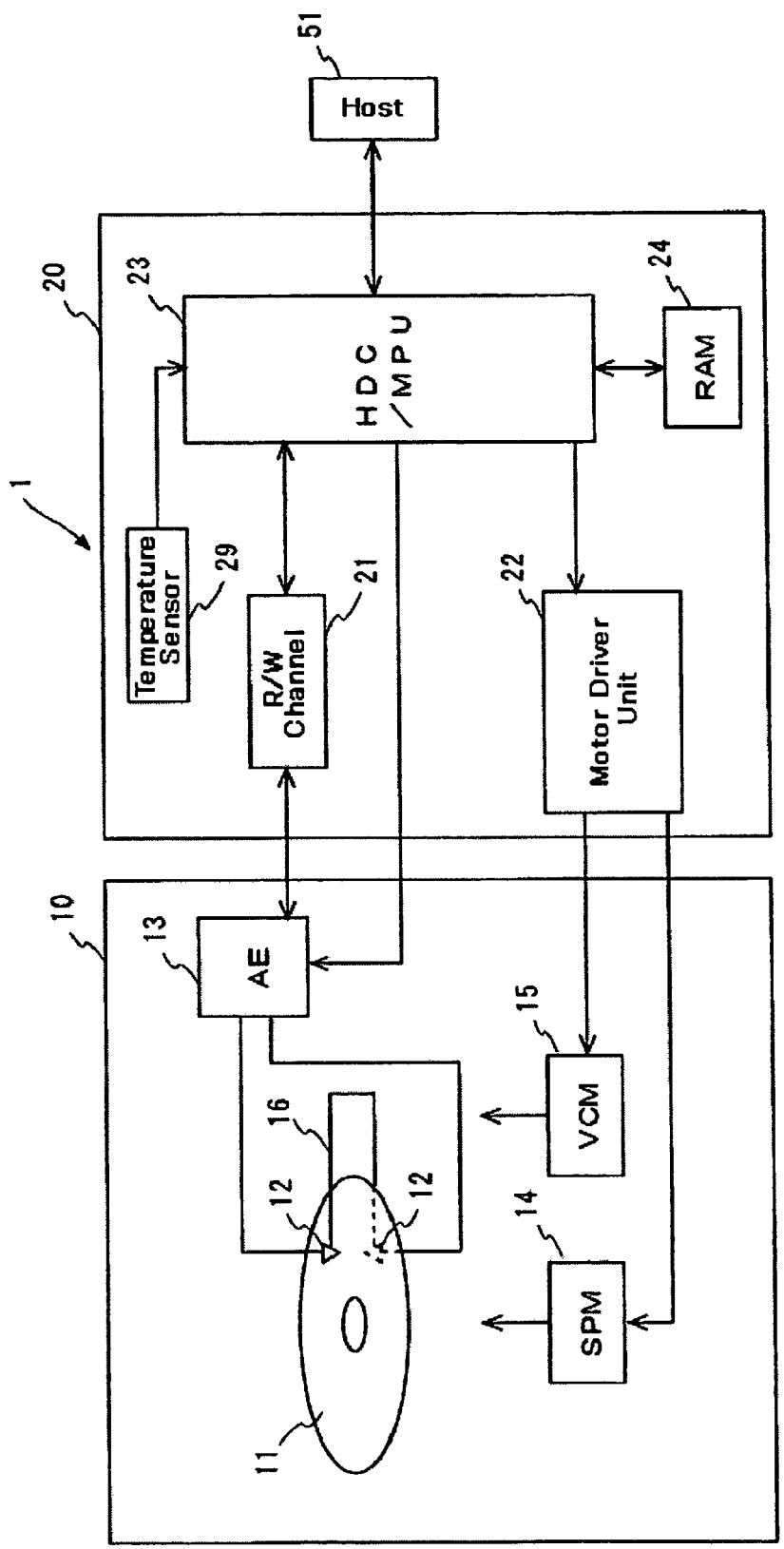
FIG. 1 is a block diagram which schematically shows the general configuration of an HDD in the present embodiment.

Embodiments of the present invention will be described below. For clear understanding, omission and simplification are made where appropriate in the following description and the drawings. In addition, where the same component appears in another drawing, the same reference numeral is given and its description is omitted for the purpose of clear understanding.

Using a hard disk drive (HDD) as an example of a magnetic storage apparatus embodiment, the following will provide a description of how the present invention is implemented. The characteristics of the present embodiment include write current control for the head element section of the HDD and heater power (heater current) control to adjust the clearance between the head element section and the magnetic disk. In the present embodiment, the recession of the head element section relative to the slider is measured and the write current or heater power to be given is determined according to the measured recession. This makes it possible to reliably prevent the head element section from colliding with the magnetic disk by controlling the protrusion of the head element section according to its recession involving a production variance.

To facilitate understanding of characteristics of the present embodiment, the general configuration of the HDD is described at first. FIG. 1 is a block diagram which schematically shows the general configuration of the present embodiment HDD 1. As shown in FIG. 1, the HDD 1 includes a magnetic disk 11 which is an example of a recording medium, a head slider 12 which is an example of a head, arm electronics (AE) 13, a spindle motor (SPM) 14, a voice coil motor (VCM) 15 and an actuator 16 in a sealed enclosure 10.

In addition, the HDD 1 has a circuit board 20 fixed to the outside of the enclosure 10. On the circuit board 20, ICs are mounted which include a read/write channel (R/W channel) 21, a motor driver unit 22, a hard disk controller (HDC)/MPU-integrated circuit (hereinafter HDC/MPU) 23 and a RAM 24. The HDD 1 is also provided with a temperature sensor 29. Note that these circuits may be either integrated in a single IC or formed across a plurality of separate ICs. The temperature sensor 29 can be disposed within the enclosure 10.

User data from an external host 51 is received by the HDC/MPU 23 and written onto the magnetic disk 11 by the head element section of the head slider 12 via the R/W channel 21 and the AE 13. In addition, user data stored on the magnetic disk 11 is read out by the head slider 12 and output to the external host 51 from the HDC/MPU 23 via the AE 13 and the R/W channel 21.

The magnetic disk 11 is fixed to the SPM 14. The SPM 14 rotates the magnetic disk 11 at a certain speed. The spindle motor 14 is driven by the motor driver unit 22 according to control data from the HDC/MPU 23. In the present embodiment, the magnetic disk 11 has a recording surface on each side and one head slider 12 is provided for each recording surface. Each head slider 12 has a slider which flies (glide) above the magnetic disk 11, and a head element section fixed to the slider as transducers for magnetic-electrical signal transductions. Each head slider 12 in the present embodiment is also provided with a heater for thermal fly height control (TFC). The heater is energized to protrude the head element section outward in order to adjust the clearance (flying height) between the head element section and the magnetic head. The structure of the head slider 12 will be described later in detail.

Each head slider 12 is fixed to the front end of an actuator 16. Attached to the VCM 15, the actuator 16 is pivoted on the pivot axis to move the head slider 12 over the magnetic disk 11 in its radial direction. The motor drive unit 22 drives the VCM 15 according to control data (called DACOUT) from the HDC/MPU 23. Note that the present embodiment may have either one or plural magnetic disks 11 and a recording surface may be formed on either each side or only one side of each magnetic disk 11.

For access to the magnetic disk 11, the AE 13 chooses one head slider 12 from the plural head sliders 12 (head element sections). A regenerative signal (read signal) retrieved by the selected head slider 12 is amplified (pre-amplified) at a certain gain by the AE 13 and sent to the R/W channel 21. A recording signal (write signal) from the R/W channel 21 is also sent by the AE 13 to the selected head slider. In addition, the AE 13 supplies current to a heater in order to adjust the clearance. The AE 13 serves as an adjustment circuit to adjust the magnitude of this current (power). According to the setting data preset by the HDC/MPU 23, the AE 13 supplies write current and heater current. In the present embodiment, these quantities are determined according to the recession of the head element section from the slider surface as described later in detail.

The R/W channel 21 executes read processing. In the read processing, the R/W channel 21 amplifies the read signal supplied from the AE 13 to a certain level of amplitude, extracts data from the obtained read signal and decodes the data. The read data comprises user data and servo data. After being decoded, the read user data is supplied to the HDC/MPU 23. In addition, the R/W channel 21 executes write processing. In the write processing, the R/W channel 21 code-modulates the write data supplied from the HDC/MPU 23 and further converts the code-modulated write data to a write signal for supply to the AE 13.

The MPU of the HDC/MPU 23 operates according to microcodes loaded into the RAM 24. When the HDD 1 is started, not only microcodes that are to run on the MPU but also data required for control and data processing are loaded into the RAM 24 from the magnetic disk 11 or a ROM (not shown in the figure). In addition to data processing-related operations such as read/write processing control, command execution order management, servo signal-used positioning control (servo control) of the head element section of the head slider 12, interface control and defect management, the HDC/MPU 23 executes general control of the HDD 1.

In addition, in the present embodiment, the read/write processing control executed by the HDC/MPU 23 includes TFC. The HDC/MPU 23 sets a heater power magnitude to the AE 13 for TFC. As well, the magnitude of current to be supplied to the write device for write operation is set to the AE 13 by the HDC/MPU 23. These values, determined according to the recession of the head element section, are registered in advance.

Figure 2:
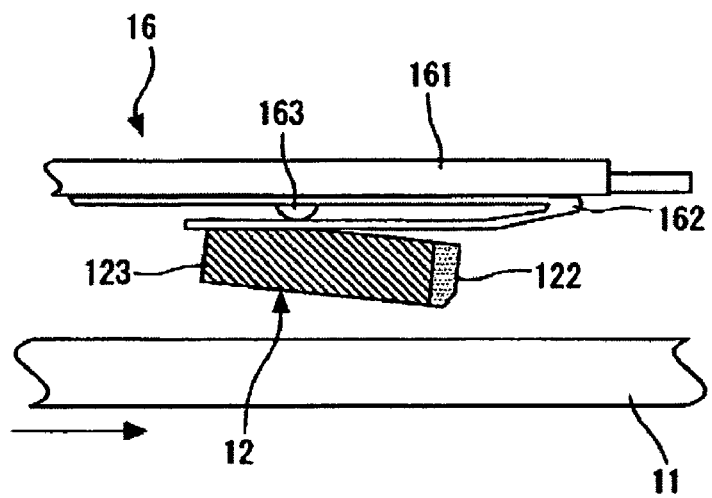
FIG. 2 schematically shows the front end of an actuator and a head slider fixed thereto in the present embodiment.

The following provides a description of how the TFC head slider 12 is configured in the present embodiment. FIG. 2 schematically illustrates the front end portion of the actuator 16 and the head slider 12 fixed thereto. The head slider 12 comprises a slider 123 and a head element section 122 formed on the slider 123. The head slider 12 is fixed to a gimbal 162 which is fixedly attached to a load beam 161. The surface of the gimbal 162 on which the head slider 12 is mounted deforms around a dimple 163 in the roll and pitch directions, providing followablity at tracking. Air flow caused by the rotating magnetic disk 11 is inhaled below the leading end. Consequently, the slider 123 flies over the recording surface of the magnetic disk 11. Therefore, a nano-order spacing (clearance) is formed between the head element section 122 of the flying slider and the recording surface of the magnetic disk 11.

Figure 3:
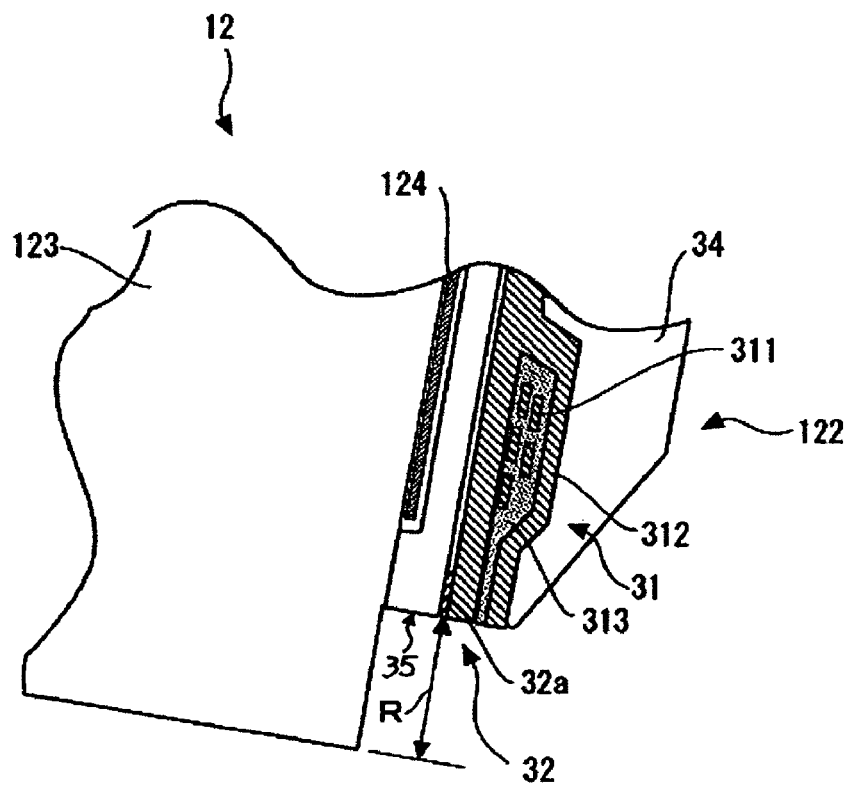
FIG. 3 schematically shows the configuration of a head slider provided with a heater for TFC in the present embodiment.

FIG. 3 is a cross sectional view of a portion of the head slider 12 around its air inflow edge (trailing end). In FIG. 3, the magnetic disk 11 rotates from left to right. As described with reference to FIG. 2, the head slider 12 comprises the head element section 122 and the slider 123 which supports the head element section 122. In addition, the head slider 12 is provided with a heater 124 for TFC. FIG. 3 shows the normal shape of the head slider 12 when neither heater current nor write current is supplied. Note that this TFC may be applied to both horizontal and perpendicular magnetic recording HDDs.

The head element section 122 reads and writes data from and to the magnetic disk 11. The head element section 122 has a read device 32 and, on its trailing side, a write device 31. The write device 31 is an inductive device which records magnetic data on the magnetic disk 11 by allowing a current to flow along a write coil 311 to generate magnetic field between magnetic poles 312. The read device 32 is a magnetoresistive device having a magnetoresistive element 32a which shows magnetic anisotropy. Magnetic data recorded on the magnetic disk 11 is retrieved based on its resistance which changes depending on the magnetic field from the magnetic disk 11.

By using thin film fabrication processes such as plating, sputtering and polishing, the head element section 122 is formed on an AlTiC board which constitutes the slider 123. The magnetoresistive element 32a is sandwiched by magnetic shields (part of which is implemented by a magnetic pole). The write coil 311 is surrounded by a dielectric film 313. In addition, the head element section 122 has a protective film 34 of alumina or the like formed to cover the write device 31 and read device 32 so as to protect the whole of the head element section 122. Note that on the air bearing surface (ABS) 35 which faces the magnetic disk 11, a protective carbon film is formed with a thickness of several nm. This provides sufficient abrasion resistance for instantaneous and light contact and prevents the write device 31 and read device 32 from corroding away.

Near the write device 31 and read device 32, the heater 124 appears. The heater 124 is a thin film resistor formed by using a thin film process. In the present embodiment, the heater 124 is disposed between the read device 32 and the slider 123. For example, the thin film resistor of the heater 124 can be obtained by forming a thin zigzag permalloy line in a certain area and filling the area with alumina. The heater 124 is designed to have a resistance of, for example, 50 Ω.

There is a height difference between the magnetic disk-facing surface of the head element section 122 and the magnetic disk-facing surface 35 (ABS) of the slider 123. That is, the head element section 12 is more distant from the magnetic disk 11 than the slider 123 by a recession R. This recession R can prevent the head element section 122 from touching bumps on the magnetic disk 11 and therefore prevent such bumps from causing thermal asperities and damaging the head element section 122.

Specifically, of the magnetic disk 11, slider 123 and head element section 122, the slider 123 is the hardest, followed by the magnetic disk 11. The head element section 122 is the least in hardness. Due to this, the magnetic disk-facing surface 35 of the head element section 122 is recessed from the magnetic disk-facing surface 35 of the slider 123. This allows the slider 123 to shave away bumps and avoid damage to the head element section 122.

Figure 4:
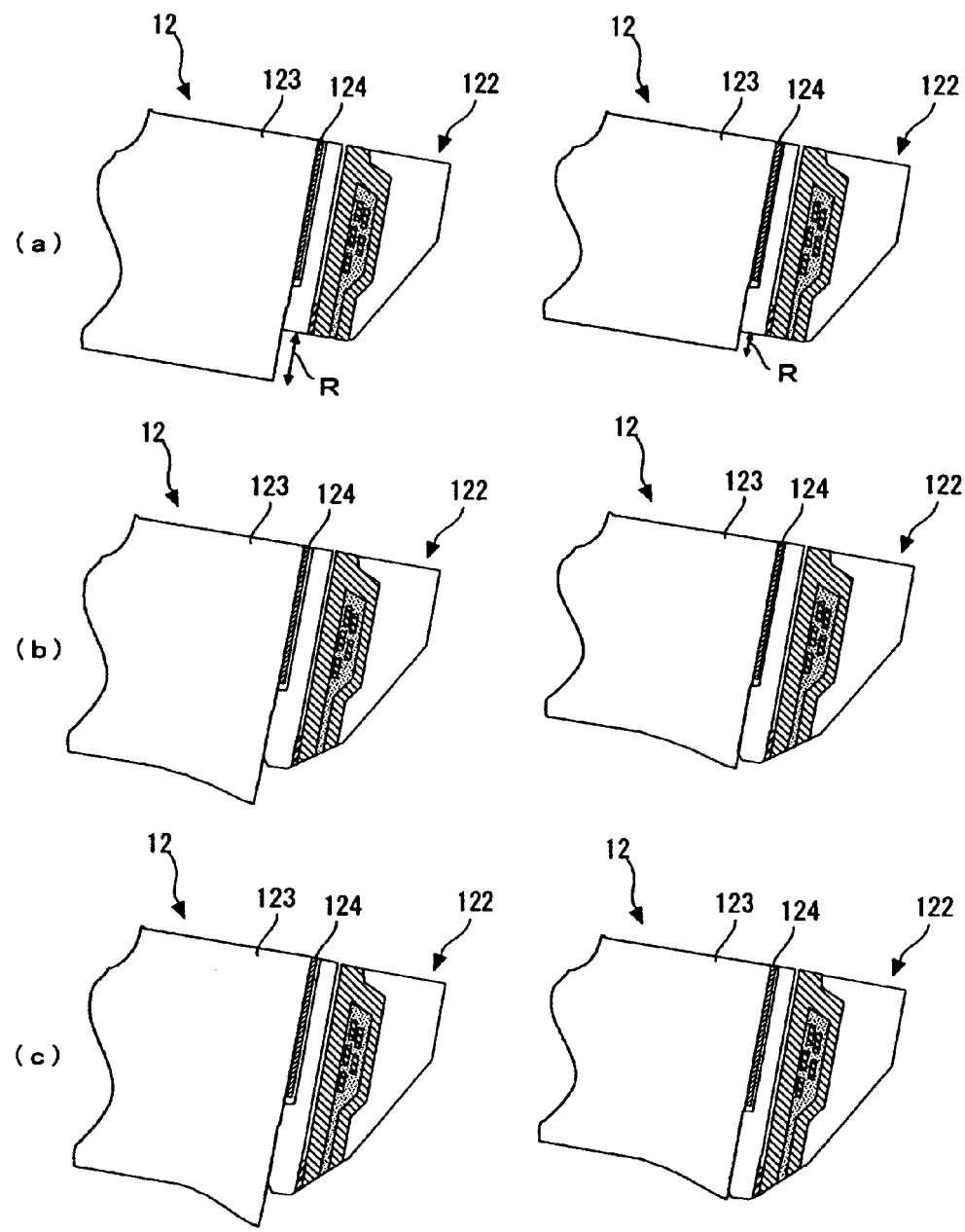
FIG. 4 schematically shows how the protrusion of the head element section of a heater-equipped head slider is dependent on the heater power in the present embodiment when the ambient temperature is ordinary (about 25° C.).
Figure 5:
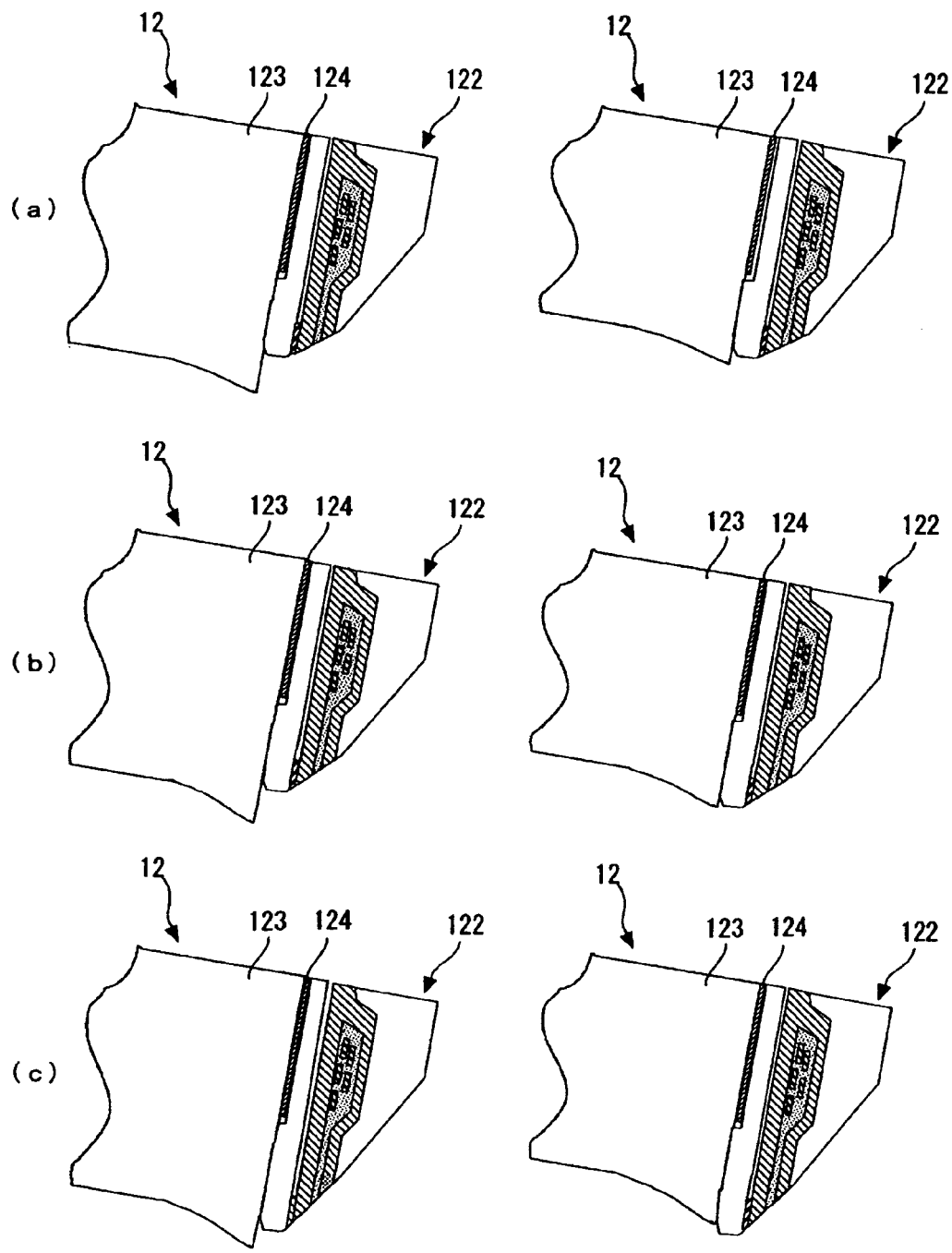
FIG. 5 schematically shows how the protrusion of the head element section of a heater-equipped head slider is dependent on the heater power in the present embodiment when the ambient temperature is high (about 65° C.).
Figure 6:
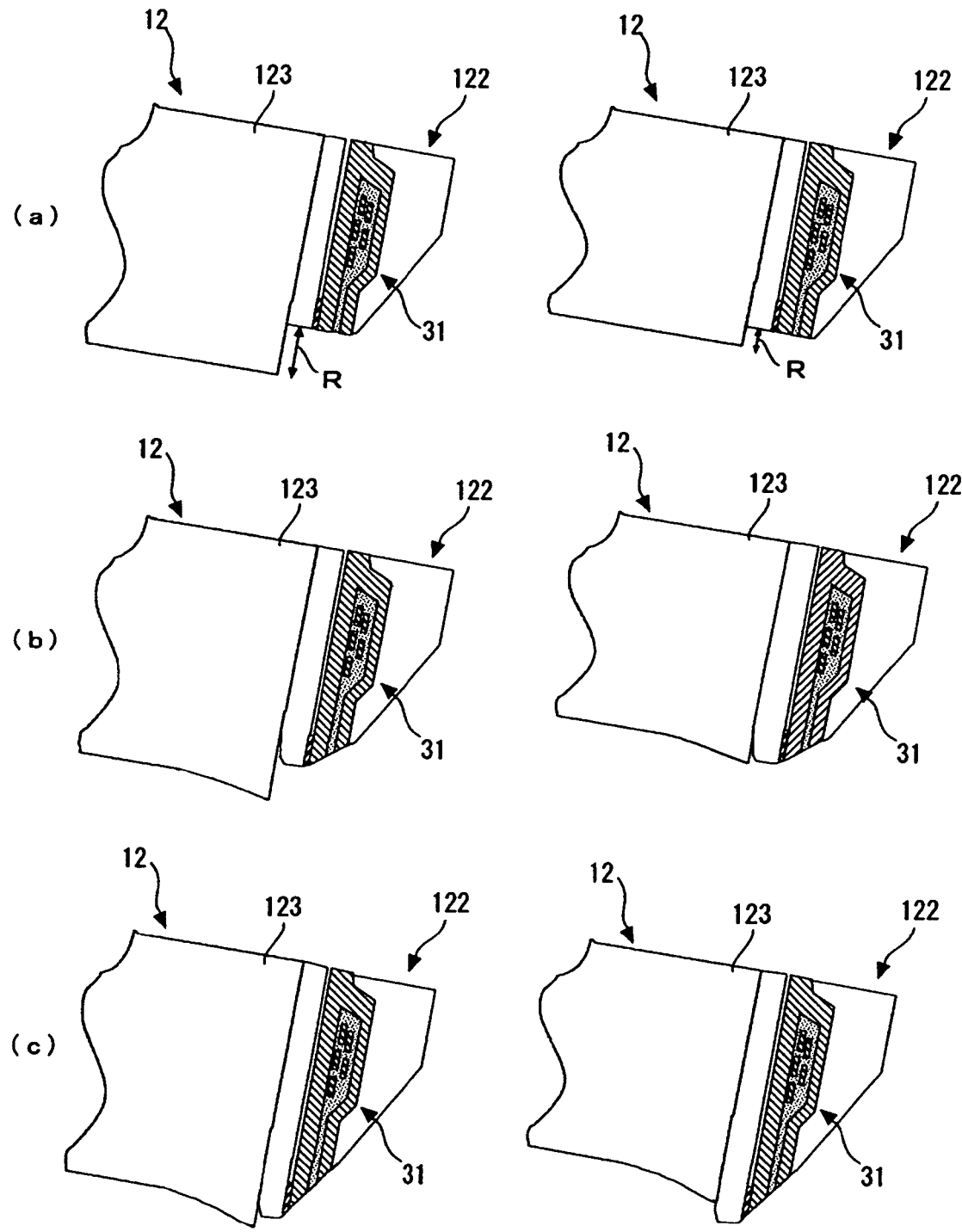
FIG. 6 schematically shows how the protrusion of the head element section of a head slider equipped with no heater is dependent on the write current in the present embodiment when the ambient temperature is ordinary (about 25° C.).

Heat from the heater 124 protrudes the head element section 122 toward the magnetic disk 11. FIG. 4 schematically shows how the protrusion of the head element section 122 is dependent on the heater power supplied to the heater 124 when the ambient temperature is ordinary (about 25° C.). From FIGS. 4(a) to 4(c), the heater power is increased from 0 mW. In FIGS. 4(a) to 4(c), two head sliders 12 are shown as examples. Each of them has a different recession. The recession R of the right head slider 12 is smaller than that of the left one. Note that each component is given the same reference number in FIG. 4 as in FIG. 3 although some are omitted. FIGS. 5 and 6 are also illustrated in this manner.

As shown in FIG. 4, if the AE 13 supplies current to the heater 124, heat from the heating element or the heater 124 deforms/protrudes the head element section 122. Specifically, a portion around the heater 124 across the head element section 122 and slider 123 protrudes. Since the protective alumina film 34 thermally expands more than the slider 123 made of AlTiC, the head element section 122 is protruded relatively more.

The head element section 122 of the left head slider 12 having a larger recession R does not protrude toward the magnetic disk 11 beyond the magnetic disk-facing surface of the slider 123 in any of FIGS. 4(a) to 4(c), namely when the heater energizing current is 0 mA (FIG. 4(a)), when the heater energizing current (power) is small (FIG. 4(b)) and when the heater energizing current (power) is large (FIG. 4(c)). The head element section 122 of the right head slider 12 having a smaller recession R also does not protrude beyond the magnetic disk-facing surface of the slider 123 but almost reaches to the level of the surface when a large current (power) is supplied (FIG. 4(c)). Thus, for the same heater power, the distance between the magnetic disk-facing surface of the slider and that of the head element section 122 is smaller if the normal recession R is smaller.

In addition to the heat from the heater 124, the protrusion of the head element section 122 is dependent also on the ambient environment temperature and the heat emitted from the write device 31. FIG. 5 schematically shows how the protrusion of the head element section 122 is dependent on the power supplied to the heater 124 when the ambient environment temperature is high (about 65° C.). In configuration, the head sliders are the same as those in FIG. 4 although the environment temperature is different. Due to the influence of the temperature, when no current is supplied to the heaters 124, the head element sections 122 shown in FIG. 5(a) are already protruded as compared with those shown in FIG. 4(a).

The head element section 122 of the left head slider 12 having a larger recession R does not protrude toward the magnetic disk 11 beyond the magnetic disk-facing surface of the slider 123 not only when the heater energizing current is 0 mA (FIG. 5(a)) and when a small current is supplied to the heater 124 (FIG. 5(b)) but also when a large current is supplied to the heater 124 (FIG. 5(c)). In the case of the right head slider 12 having a smaller recession R, the head element section 122 protrudes toward the magnetic disk 11 beyond the magnetic disk-facing surface of the slider 123 when the large current is supplied to the heater 124 (FIG. 5(c)).

Thus, even when the same power is supplied to each head slider 12, each head slider 12 may have a different distance between the head element section 122 and the magnetic disk-facing surface of the slider 123 since each head slider 12 has a specific recession R. Accordingly, as shown in FIG. 5(c), the head element section 122 of the head slider 12 having a smaller recession R protrudes much beyond the slider 123 at high temperature if a large current is supplied to the heater 124. This greatly increases the possibility that the head element section 122 may be damaged due to collision with the magnetic disk 11. It is therefore necessary to set the heater power so as not to protrude the head element section 122 much beyond the slider 123.

On the other hand, to read and write data from and to the magnetic disk 11, the head element section 122 should be as close to the magnetic disk 11 as possible by minimizing the clearance therebetween. It is therefore necessary to set an appropriate heater power according to the recession R of each head slider 12. The heater power must be relatively low if the recession R of the head slider 12 is relatively large. It is also important to change the heater power according to the temperature. That is, the heater power is lowered at high temperature while the power is raised at low temperature.

As described above, the protrusion of the head element section 122 is also dependent on the heat (Joule heat) emitted from the write device 31 which is a heating element. Since the write device 31 writes data on the magnetic disk 11 by generating a magnetic field by a current which flows along the coil 311, the write device 31 emits heat due to the write current. FIG. 6 schematically shows how the protrusion of the head element section 122 is dependent on the write current at ordinary temperature (about 25° C.). The head sliders 12 shown in FIG. 6 are not provided with the heater 124. In the other respects, they are the same as the above-mentioned head sliders 12. From FIGS. 6(a) to 6(c), the write current is increased from 0 mA. In FIGS. 6(a) to 6(c), two head sliders 12 are shown as examples. Each of them has a different recession. The recession R of the right head slider 12 is smaller than that of the left one.

In FIG. 6, the head element section 122 of the left head slider 12 having a larger recession R does not protrude toward the magnetic disk 11 beyond the magnetic disk-facing surface of the slider 123 not only when the write current is 0 mA (FIG. 6(a)) (i.e., information write is not done) and when a small write current is supplied (FIG. 6(b)) but also when a large write current is supplied (FIG. 6(c)). In the case of the right head slider 12 having a larger recession R, the head element section 122 protrudes toward the magnetic disk 11 beyond the magnetic disk-facing surface of the slider 123 when the large write current is supplied (FIG. 6(c)).

What are described about the heater current is also applicable to the write current. That is, even when the same write current is supplied, each head slider 12 may have a different distance between the head element section 122 and the magnetic disk-facing surface of the slider 123 since each head slider 12 has a specific recession R. Accordingly, as shown in FIG. 6(c), the head element section 122 of the head slider 12 having a smaller recession R protrudes much beyond the slider 123 due to the heat emitted from the write device 31 when a large write current is supplied. This greatly increases the possibility that the head element section 122 may be damaged due to collision with the magnetic disk 11. It is therefore necessary to set the write current so as not to protrude the head element section 122 much beyond the slider 123. Preferably, the write current is controlled so as not to protrude the head element section 122 beyond the magnetic disk-facing surface of the slider.

It is therefore necessary to set an appropriate write current according to the recession R of each head slider 12. The write current must be relatively low if the recession R of the head slider 12 is relatively large. In addition, the write current is changed according to the temperature. It is important to lower the write current when the temperature is high. In addition, as understood from the above description, the heater current during data write should be set to 0 or a level much lower than that during data read since the write current serves to protrude the head element section 122 while the write current is being supplied to the write device 32.

In the present embodiment, the magnitude of the write current and the magnitude of the heater power (heater current) are set according to the recession of the head slider 12. Due to process fluctuations, each head slider has a different recession. In the present embodiment, the recession of each head slider 12 is measured in the process of manufacturing the HDD 1. In the HDD 1, write current and heater power values are registered for each head slider 12 in advance according to the measurement. The HDD 1 supplies write current and heater power to each head slider 12 according to the values registered for the head slider 12. This can reliably prevent the head element section 122 of each head slider from colliding with the magnetic disk 11.

Generally, to reliably prevent the head element section 122 from colliding with the magnetic disk 11 while attaining high write performance, both write current and heater power (current) should be changed according to the recession R. As the case may be, it is satisfactory to change only one of the write current and heater power according to the recession. If the head slider is not provided with a TFC heater, only the write current is changed according to the recession. In this case, a relatively large write current is supplied if the head slider 12 has a relatively large recession.

Figure 7:
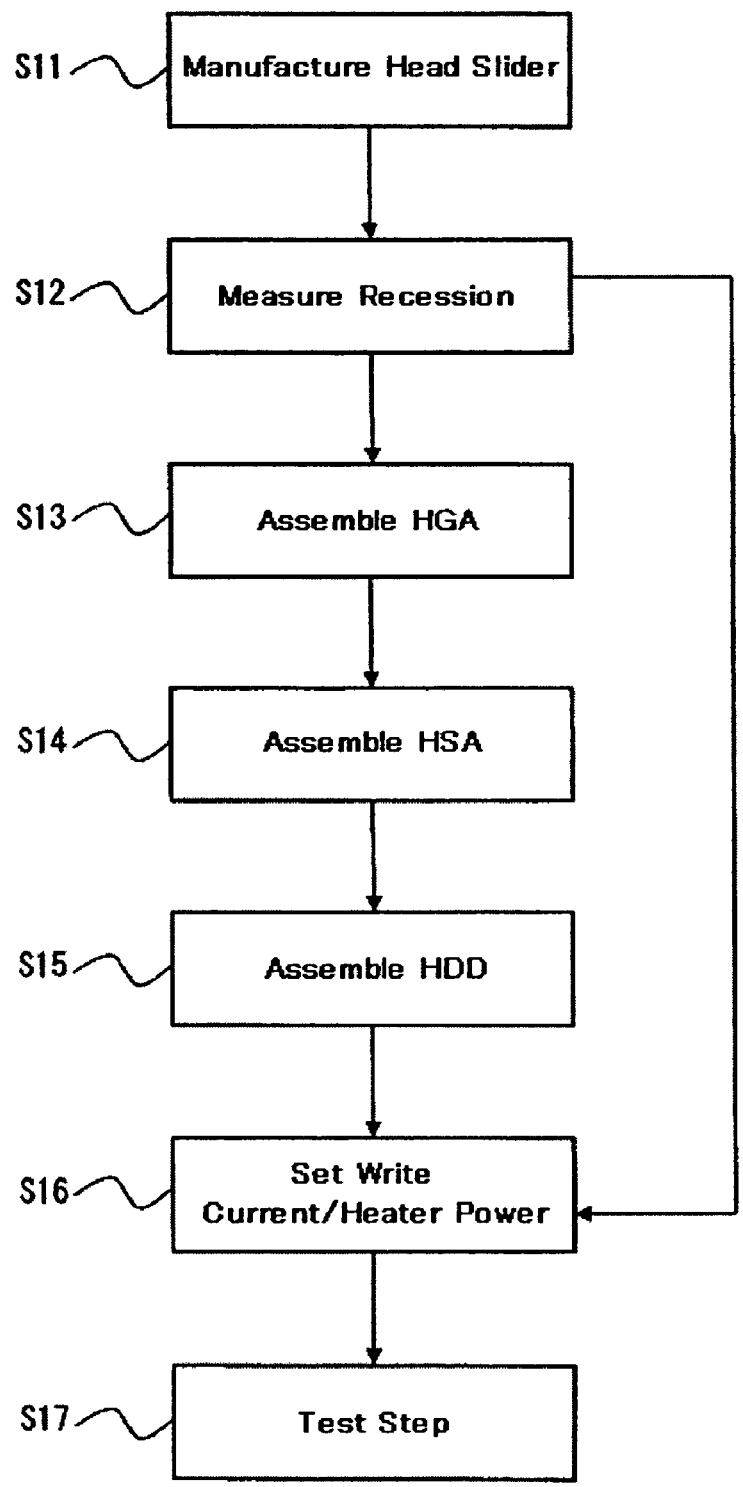
FIG. 7 is a flowchart showing the recession measurement-included process of manufacturing an HDD in the present embodiment.

As described above, measurement of recession R is done in the process of manufacturing the HDD 1. With reference to FIG. 7, the following describes how the HDD 1 is manufactured in the present embodiment. At first, a head slider 12 is manufactured (S11). In the head slider manufacturing step, a head element section 122 and a heater 124 are formed on an AlTiC substrate by using a thin film fabrication process. Then, the recession of each manufactured head slider 122 is measured (S12). The recession can be measured by using, for example, an AFM (Atomic Force Microscope) or an optical microscope. Combined with an identifier number which is associated with the corresponding head slider 12, each measured recession is stored in a storage device of the manufacturing equipment. If a measured recession is lower than the lower limit or larger than the upper limit, the head slider 12 is excluded from the manufacturing process as an error head slider.

By mounting each recession-measured head slider 12 to a suspension, an HGA (Head Gimbal Assembly) is assembled (S13). The suspension has a load beam 161 and gimbals 162. Typically, a base plate is attached to the pivot axis side of the load beam 161. The head slider 12 is attached to the tongue portion of the gimbals 162 by using adhesive or the like. For connection to the signal transmission traces, soldering or the like is done.

Then, an HSA (Head Stack Assembly) is assembled by combining the assembled HGAs with an arm and a VCM coil (S14). The HSA has actuators 16 and head sliders 12. Typically, a plurality of head sliders 12 are mounted to one HSA. Then, AE 13 is mounted to the assembled HSA and the HSA, a magnetic disk 11, a SPM 14 and the like are fixed in an enclosure 10.

Further, an HDD 1 is assembled by mounting a circuit board 20 where the individual circuits are integrated (S15). At the ROM or magnetic disk 11 of the HDD 1, a write current value and a heater power value are set/registered for each head slider 12 (S16). Then, after a test step (S17), the HDD 1 is shipped as a product. If the required characteristics are not obtained in the test step (S16), the HDD 1 is excluded as an error HDD 1.

Figure 8:
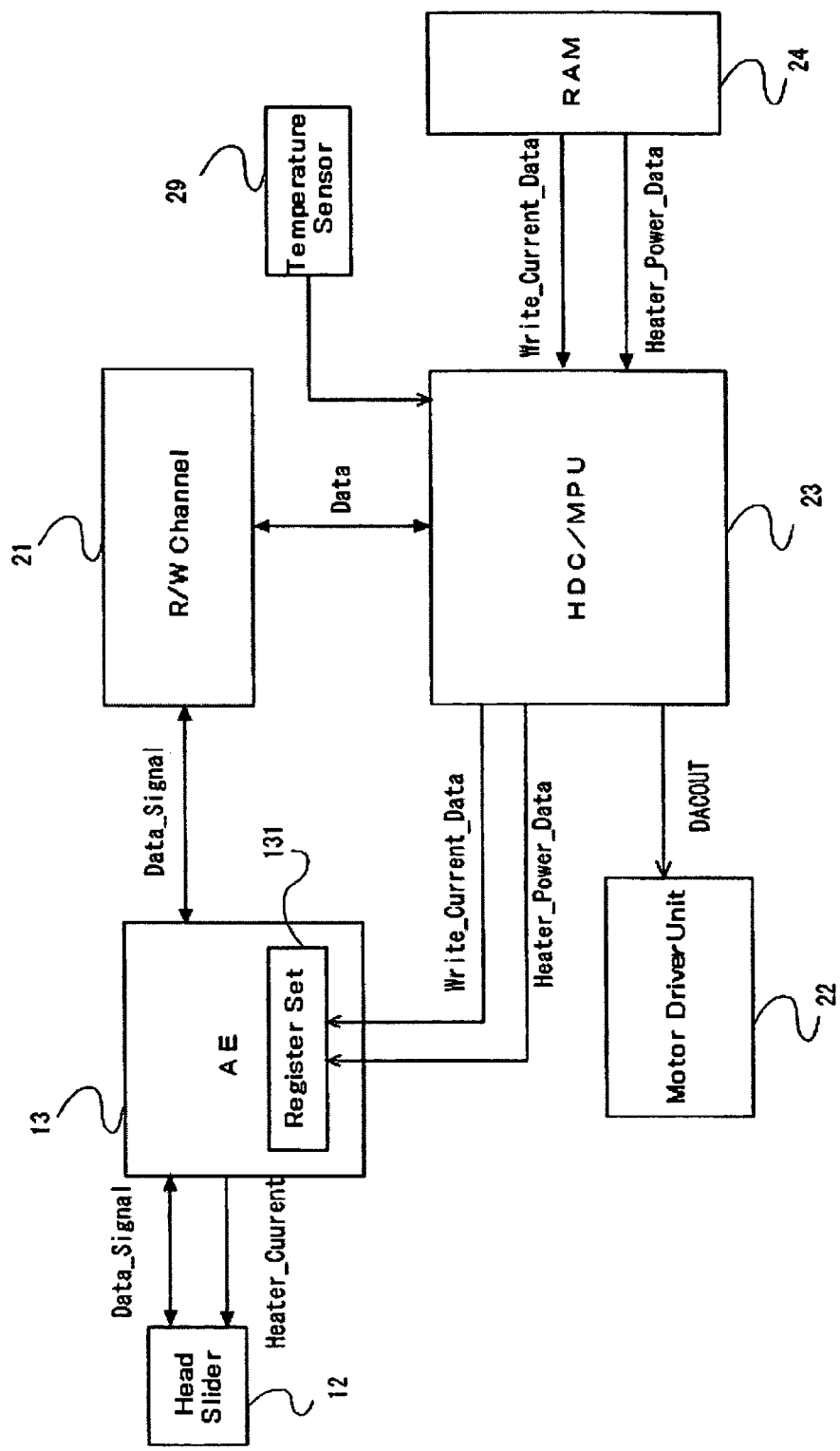
FIG. 8 is a block diagram showing signals (including data) which are transferred between function blocks to control the write current and heater power in the present embodiment.

Then, the following provides a detailed description of how the write current and heater power are controlled in the HDD 1. FIG. 8 shows signals (including data) which are transferred between function blocks to control the write current and heater power. Between the HDC/MPU 23 and the R/W channel 21, read data, write data and servo data (denoted as Data) are transferred for read and write operations. To the motor driver unit 22, the HDC/MPU 23 outputs data (DACOUT) indicative of a VCM current according to the servo data. A VCM current consistent with the obtained DACOUT is supplied from the motor driver unit 24 to the VCM 15.

Between the R/W channel 21 and the AE 13, signals (Data_Signal) corresponding to read data, write data and servo data are exchanged. The head slider 12 reads out servo data or user data. The data signal (Data_Signal) from the head slider 12 is amplified by the AE 13 and transferred to the R/W channel 21. The R/W channel 21 performs certain signal processing to generate servo data or user data (Data) and transfers the data to the HDC/MPU 23. In addition, the R/W channel 21 performs signal processing on the user write data (Data) from the HDC/MPU 23 and outputs the result to the AE 13 as a data signal (Data_Signal). The AE 13 amplifies the data signal and outputs it (Data_Signal) to the head slider 12.

The AE 13 is provided with a register set 131 composed of plural registers. In each register, write current values, heater power values, mode identifiers, bias current values and the like are set. To each head slider 12, the AE 13 supplies a write current (Data_Signal) and a heater current (Heater_Current) according to the corresponding write current values and heater power values which are set in the register.

According to an environment temperature signal (Temp_Signal) from a temperature sensor 29, for example, a thermistor, the HDC/MPU 23 determines a write current value and a heater power value and sets data (Write_Current_Data) indicative of the write current value and data (Heater_Power_Data) indicative of the heater power value to the register set 131 of the AE 13. In determining write current and heater power values, the HDC/MPU 23 refers to the tables stored in the RAM 24.

FIGS. 9 to 11 show the respective tables stored in the RAM 24. FIG. 9 shows a head vs. recession level table 241 which associates each head slider with a recession level. FIG. 10 shows a write current table 242 which associates each recession level (RL) with a write current value. FIG. 11 shows a heat power table 243 which associates each recession level with a heater power value. Write current and heater power values for a head slider are determined based on its recession level and the environment temperature detected by the temperature sensor 29. Each table is set/registered beforehand in the HDD 1 in the process of manufacturing the HDD 1.

As shown in the head vs. recession level table 241 of FIG. 9, the HDD 1 of the present embodiment has four head sliders 12. To identify the head sliders 12, each head slider 12 is given a unique number, one of 0 to 3. A range of recession is divided into plural segments. To each head slider 12, a recession level is set as its recession. In this example, four recession levels are defined. For example, 1-2 nm, 2-3 nm, 3-4 nm and 4-5 nm recession segments are associated with recession levels 0, 1, 2 and 3, respectively. To each head slider 12, a recession level which corresponds to the measured recession is assigned. The number of recession levels and their corresponding recession ranges can be designed appropriately. It is also possible to directly set the measured recession instead of a recession level.

As shown in the write current table 242 of FIG. 10 and the heater power table 243 of FIG. 11, write current and heater power values are determined for each of three environment temperature divisions: Low Temperature, Nominal Temperature and High Temperature segments. Here, similar to the tables, let us use Write_Current_XY to denote a write current value and Heater_Power_XY to denote a heater power value where the extensions X and Y mean one of the temperature divisions (L, N and H) and one of the recession levels (0 to 3).

For example, a temperature range below 5° C., a temperature range beyond 45° C. and a temperature range between 5° C. and 45° C. are respectively set to the Low Temperature, High Temperature and Nominal Temperature segments. A common temperature division rule can be used for both write current and heater power. It is also possible to use different temperature division rules for write current and heater power. For example, it is possible to use four temperature segments for write current and three temperature segments for heater power. It is also possible to use the same number of temperature segments, for example, low temperature, nominal temperature and high temperature segments, for both write current and heater current and set different temperatures as segment boundary temperatures for write current and heater current.

As understood from the above description, the respective write current values in the write current table 242 has the following relation for each recession level (Y):

Write_Current_LY
>Write_Current_NY>Write_Current_HY

Likewise, the respective write current values has the following relation for each temperature segment (X):

Write_Current_$_X$0<Write_Current_
$_X$1<Write_Current_$_X$2<Write_Current_$_X$3

If one recession level is four times as large as another recession level, like "4-5 nm" for "1-2 nm", the write current is set to, for example, 40 mA and 20 mA for "4-5 nm" and "1-2 nm" respectively. The former write current is twice as large as the latter current since the calorific power emitted by the write device 31 is proportional to the square of the write current. Actually, however, each value is determined by experiment since the resistance of the write device 31 also changes depending on the write current. The spirit of the present embodiment is to set a larger write current for a head slider 12 if the head slider 12 has a larger recession.

Similarly, the respective heater power values in the heater power table 243 has the following relation for each recession level (Y):

Heater_Power_$LY$>Heater_Power_$NY$>Heater_Power_$HY$

Likewise, the respective heater power values have the following relation for each temperature segment (X):

Heater_Power_$x0$<Heater_Power_$x1$<Heater_Power_$x2$<Heater_Power_$x3$

In the case of heater power, if one recession level is four times as large as another recession level, like "4-5 nm" for "1-2 nm", the heater power set to "4-5 nm" is also four times as large as the heater power set to "1-2 nm". Note that the spirit of the present embodiment is to apply a relatively large power (or energizing current) to the heater 124 if the recession R is relatively large. Actual values are determined by experiment.

Here, assume that the present embodiment uses the heater 124 for read operation but does not use the heater 124 for write operation. The head element section 122 is protruded by the Joule heat of the write device 31. In the read sequence, the read device 32 does not emit heat unlike the write device 31. Therefore, when data is read, the head element section 12 is protruded by the heat emitted from the heater 124 (see FIGS. 4 and 5). When data is written, the head element section 122 is protruded by the heat emitted from the write device 31 (see FIG. 6). Needless to say, it is also possible to use the thermal emission of the heater 124 in addition to that of the write device 31 when data is written.

The following provides a detailed description of how heater power and write current values are set. For write operation, the HDC/MPU 23 sets a write current value to a register of the AE 13 before starting a seek. In more detail, the HDC/MPU 23 refers to the head vs. recession level table 241 and recognizes the recession level of the head slider which is to write data to a target sector. Further, the HDC/MPU 23 recognizes the current environment temperature division from the temperature detected by the temperature sensor 29. The HDC/MPU 23 refers to the write current table 242 and determines a write current value from the recognized recession level and environment temperature division. Data representing this write current value is set to the register set 131 of the AE 13.

The HDC/MPU 23 controls the head slider 12 to seek the target track and write data to a target sector. The AE 13 supplies the set write current to the write device 31 to write data to the target sector.

For read operation, the HDC/MPU 23 sets a heater power value to a register of the AE 13 before starting a seek. In more detail, the HDC/MPU 23 refers to the head vs. recession level table 241 and recognizes the recession level of the head slider which is to read data from a target sector. Further, the HDC/MPU 23 recognizes the current environment temperature division from the temperature detected by the temperature sensor 29. The HDC/MPU 23 refers to the heater power table 243 and determines a heater power value from the recognized recession level and environment temperature division. Data representing this heater power value is set to the register set 131 of the AE 13.

The HDC/MPU 23 controls the head slider 12 to seek the target track and read data from the target sector. The AE 13 supplies a heater current consistent with the set heater power value to the heater 124. When the target sector is reached, the AE 13 amplifies the output of the read device 32 on the head slider 12 and transmits the resulting data signal (Data_Signal) to the R/W channel 21.

While a constant heater power is set to each temperature division in the above example, it is also possible to determine the heater power as a function of the detected temperature. For example, a heater power is assigned to each of four predetermined temperatures LT, NT, HT and HT_Limit. Between adjacent predetermined temperatures, the heater power is calculated as a linear function of the temperature. For example, if heater powers Power_LT and Power_NT are respectively assigned to LT and NT, the heater power between LT and NT may be given by:

Power=(Power_$LT$−Power_$NT$)/($NT$−$LT$)×($NT$−$T$)+Power_$NT$

The heater power between other predetermined temperatures can also be calculated in the same manner. In the temperature ranges below LT and beyond HT_Limit, constant heater powers may be assigned. Predetermined temperatures, the number of predetermined temperatures, and heater powers are set for read and write separately. For the same temperature, the heater powers set respectively for the recession levels has the same magnitude relation as described above.

Although the present invention has so far been described by using an exemplary embodiment as an example, the present invention is not limited to the embodiment. Those skilled in the art can readily make modification, addition and alteration to each component of the embodiment without departing from the scope of the present invention. For example, the TFC of the embodiment can be applied to an HDD where each head slider is provided with only a read device or a write device.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage apparatus comprising:
   a head slider comprising a slider and a head element section wherein the head element section is recessed from the slider when viewed from a magnetic disk;
   a heating element;
   a controller which refers to preliminarily registered data in the data storage apparatus and determines a magnitude of current to be supplied to the heating element capable of changing protrusion of the head element section wherein the preliminarily registered data includes a plurality of temperature level-dependent values, each of which representing a magnitude of current appropriate for a measured recession level that corresponds to a distance that the head element section is formed further away from the magnetic disc than the slider; and
   a current supply circuit which supplies a current to the heating element according to the determination of the controller wherein the controller accesses the preliminarily registered data for controlling the protrusion of the head element section.

2. A data storage apparatus according to claim 1 wherein the heating element is a heater to adjust the protrusion of the head element section and the current to the heating element is a heater current which flows along the heater.

3. A data storage apparatus according to claim 1 wherein:
   the heating element is a write device; and
   the current to the heating element is a write current to write data to the magnetic disk.

4. A data storage apparatus according to claim 1 wherein:
   the data storage apparatus includes a plurality of head sliders;

the controller refers to preliminarily registered data and determines the magnitude of current to be supplied to each of the plural head sliders wherein the registered data represents a magnitude of current appropriate for the recession level of the head element section of each head slider; and the registered data is such that the magnitude of current set to a head slider is larger than the magnitude of current set to a head slider having a smaller recession level.

5. A data storage apparatus according to claim 1 wherein the registered data is such that the magnitude of current increases as the preliminarily measured recession level of the head slider increases.

6. A data storage apparatus comprising:

a plurality of head sliders each of which has a slider and a head element section and a heating element, the head element section being recessed from the slider when viewed from a magnetic disk;

a controller which determines a magnitude of current to be supplied to the heating element of each of the head sliders to increase protrusion of the head element section in such a manner that the magnitude of current is increased as a recession level of the head element section increases, wherein the recession level corresponds to a distance that the head element section is formed further away from the magnetic disc than the slider; and a current supply circuit which supplies a current to the heating element according to the determination of the controller, wherein the controller refers to preliminarily registered data in the data storage apparatus and determines the magnitude of current to be supplied to each of the plural head sliders wherein the registered data represents a magnitude of current which increases as the recession level of the head element section of each head slider increases; and the magnitude of current represented by the preliminarily registered data is determined based on the preliminarily measured recession level of the head element section, and wherein the registered data includes a plurality of temperature level-dependent values as current magnitudes.

7. A data storage apparatus according to claim 6 wherein the heating element is a heater to adjust the protrusion of the head element section and the current to the heating element is a heater current which flows along the heater.

8. A data storage apparatus according to claim 6 wherein:

the heating element is a write device; and the current to the heating element is a write current to write data to the magnetic disk.

\* \* \* \* \*